United States Patent
Yamada et al.

(10) Patent No.: US 7,619,821 B2
(45) Date of Patent: Nov. 17, 2009

(54) OPTICAL ELEMENT HAVING ANTI-REFLECTION COATING

(75) Inventors: Kazuhiro Yamada, Saitama (JP); Yasuhiro Sakai, Saitama (JP); Hiroyuki Nakayama, Tokyo (JP); Maki Yamada, Saitama-ken (JP)

(73) Assignee: Hoya Corporation, Tokyo (JP)

( * ) Notice: Subject to any disclaimer, the term of this patent is extended or adjusted under 35 U.S.C. 154(b) by 325 days.

(21) Appl. No.: 11/620,805

(22) Filed: Jan. 8, 2007

(65) Prior Publication Data
US 2008/0192350 A1   Aug. 14, 2008

(30) Foreign Application Priority Data
Jan. 11, 2006  (JP) .............................. 2006-004125

(51) Int. Cl.
*G02B 1/10*   (2006.01)
(52) U.S. Cl. ..................................... 359/581
(58) Field of Classification Search ................ 359/580, 359/581; 369/112.01, 112.23
See application file for complete search history.

(56) References Cited

U.S. PATENT DOCUMENTS

| | | | | |
|---|---|---|---|---|
| 6,359,735 | B1 * | 3/2002 | Gombert et al. ............. | 359/580 |
| 7,161,744 | B2 * | 1/2007 | Ohta et al. .................. | 359/719 |
| 2005/0233113 | A1 | 10/2005 | Kotani et al. | |
| 2006/0154044 | A1 | 7/2006 | Yamada et al. | |
| 2006/0239886 | A1 | 10/2006 | Nakayama et al. | |
| 2006/0281828 | A1 | 12/2006 | Nakayama et al. | |

FOREIGN PATENT DOCUMENTS

| | | |
|---|---|---|
| JP | 6-167601 | 6/1994 |
| JP | 9-202649 | 8/1997 |
| JP | 9-202650 | 8/1997 |
| JP | 9-202651 | 8/1997 |
| JP | 2001-272506 | 10/2001 |
| JP | 2005-173029 | 6/2005 |
| JP | 2005-234447 | 9/2005 |
| JP | 2005-275372 | 10/2005 |

OTHER PUBLICATIONS

English Language Abstract of JP 2005-173029.
English Language Abstract of JP 6-167601.
English Language Abstract of JP 2001-272506.
English Language Abstract of JP 2005-234447.
English Language Abstract of JP 2005-275372.
English Language Abstract of JP 9-202649.
English Language Abstract of JP 9-202650.
English Language Abstract of JP 9-202651.
U.S. Appl. No. 11/557,569 (Yamada et al.), filed Sep. 21, 2006 and entitled, "Protective Cover for Display Panel and Its Use".
U.S. Appl. No. 11/617,068 (Sakai et al.), filed Dec. 28, 2006 and entitled, "Dust-Proof, Light-Transmitting member and its Use, and Imaging Apparatus Comprising the Same".

* cited by examiner

*Primary Examiner*—Alessandro Amari
(74) *Attorney, Agent, or Firm*—Greenblum & Bernstein, P.L.C.

(57) ABSTRACT

An optical element comprising a lens having a portion with a surface inclination angle of 50° or more within an effective-diameter region, the portion being 10% or more of the effective-diameter region in a projected area, and an anti-reflection coating formed on the lens, the anti-reflection coating having fine roughness with three-dimensional average surface roughness of 5-100 nm on the surface.

4 Claims, 4 Drawing Sheets

OPTICAL ELEMENT HAVING ANTI-REFLECTION COATING

FIELD OF THE INVENTION

The present invention relates to an optical element having an anti-reflection coating, particularly to a high-curvature optical element suitable for light information recording/regenerating apparatuses, semiconductor-developing apparatuses, cameras, endoscopes, light communications parts, etc.

BACKGROUND OF THE INVENTION

Figure 3:
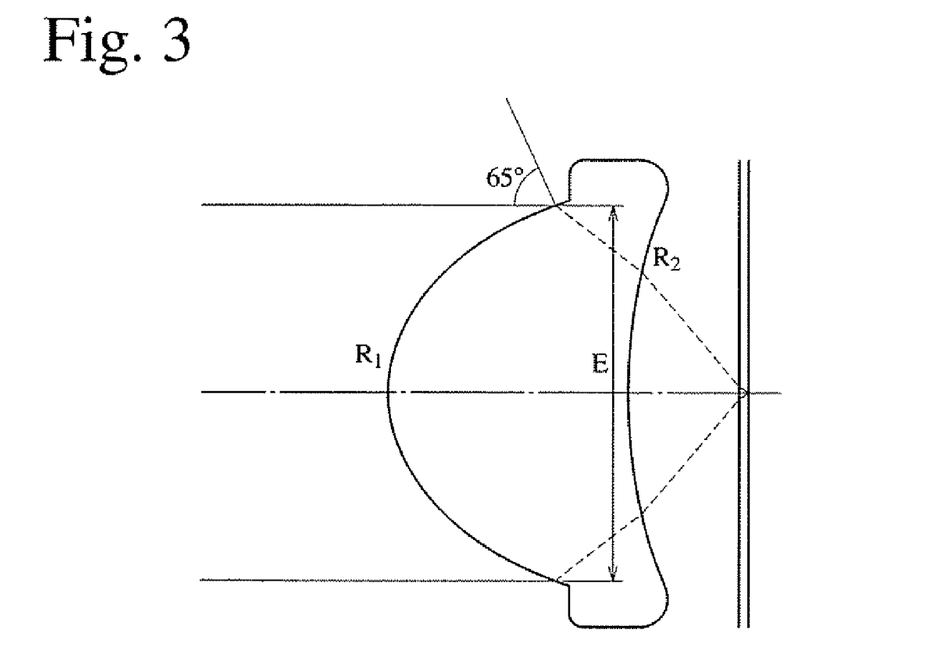
FIG. 3 is a cross-sectional view showing one example of conventional object lenses for light pickup apparatuses.
Figure 4:
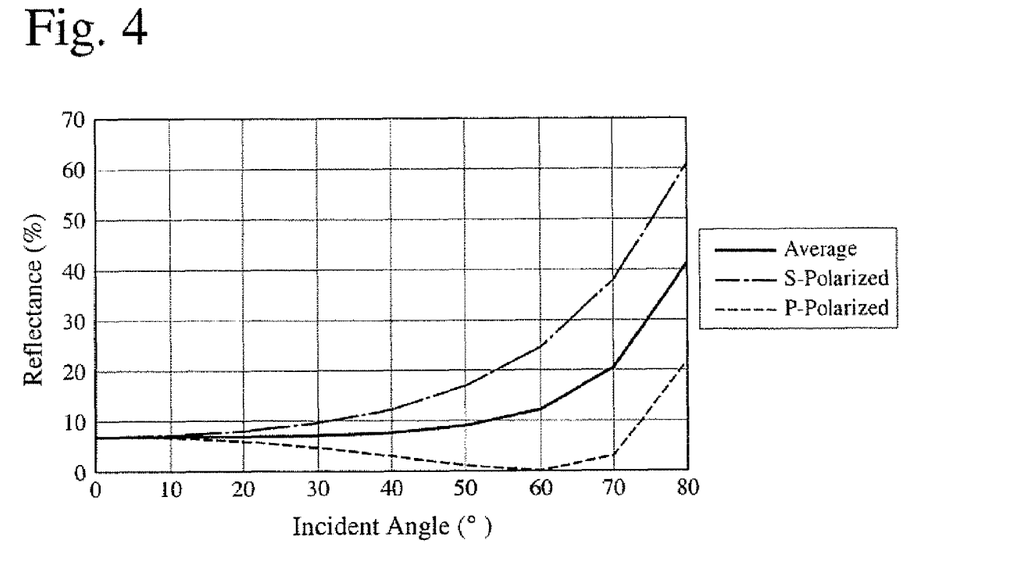
FIG. 4 is a graph showing the relation between the incident angle and reflectance of light in the lens of FIG. 3.

High-curvature lenses are used as object lenses for light information recording/regenerating apparatuses (light pickup apparatuses) and semiconductor-developing apparatuses. Typical examples of the high-curvature lenses are those having large numerical apertures (NA). Recently proposed are light pickup apparatuses comprising object lenses having NA of 0.85, which are used for laser beams having wavelength of 405 nm. A lens having NA of 0.85 has a shape shown in FIG. 3, for instance. When used as an object lens, laser beams enter into the lens through a surface $R_1$ and exits from a surface $R_2$. Substantially parallel laser beams are vertically incident to the object lens at a center. Accordingly, the light has an extremely large incident angle in a peripheral portion of the lens. In the example shown in FIG. 3, the maximum incident angle of light is 65° in an effective-diameter region E of the lens. Although incident light desirably passes through the object lens efficiently, the amount of reflected light increases proportionally to the incident angle. FIG. 4 shows the reflectance of a lens having the shape shown in FIG. 3 at a surface $R_1$, which is made of glass having a refractive index of 1.72. 15.5% of the incident light is reflected by the lens at a position at which the incident angle is 65°.

To reduce the amount of reflected light to achieve efficient transmission, object tenses for light pickup apparatuses and semiconductor-developing apparatuses are provided with anti-reflection coatings. For instance, a single-layer, anti-reflection coating is designed to have such thickness that the light path difference between light reflected at a surface of the anti-reflection coating and light reflected at a boundary between the anti-reflection coating and the lens is odd times a half of the wavelength, so that these reflected lights are cancelled by interference. The single layer, anti-reflection coating is designed to have a refractive index smaller than that of a lens and larger than those of incident media such as air, etc. It is said that an anti-reflection coating formed on a lens made of glass having a refractive index of about 1.5 ideally has a refractive index of 1.2-1.25. However, there is no material having such an ideal refractive index. Accordingly, $MgF_2$ having a refractive index of 1.38 is widely used as a material for the anti-reflection coating.

Anti-reflection coatings made of inorganic materials such as $MgF_2$ are conventionally formed by a vacuum vapor deposition method, a sputtering method, a CVD method, etc. However, the anti-reflection coating formed by these methods is generally thinner on a peripheral portion of the lens than on a center portion thereof. In general, the optical thickness $D(\theta')$ of the anti-reflection coating at an incident angle $\theta'$ is represented by the following formula (4):

$$D(\theta')=D_0 \cdot (\cos \theta')^x \qquad (4),$$

wherein $D_0$ is the optical thickness of the anti-reflection coating at a lens center, and x is a constant of 0-1. When the anti-reflection coating is formed by a vacuum vapor deposition method, x is about 0.7. Thus, the optical thickness is deviated from the designed thickness in a peripheral portion of the lens, and sufficient anti-reflection characteristics cannot be obtained because of a large incident angle as described above, resulting in an extremely large amount of reflected light. Accordingly, such optical element suffers from the problem that although there is high transmission in a center portion, there is insufficient transmission in the entire element. In addition, to form the anti-reflection coating by a vapor deposition method, a vacuum apparatus is needed, resulting in high production cost.

JP 2005-173029A proposes an optical element comprising an anti-reflection coating designed to (a) minimize the sum of light reflected in each region obtained by dividing a lens surface in an effective-diameter region, or (b) maximize the sum of light transmitted through each region. This optical element has high transmission as a whole, but the use of a conventional anti-reflection coating made of $MgF_2$ having as relatively high a refractive index as 1.38 fails to provide satisfactory anti-reflection characteristics.

The formation of fine roughness on a lens surface is known to provide the lens with anti-reflection characteristics. Specifically, a lens is directly worked by a chemical treatment method such as etching, and/or a physical treatment method such as mechanical roughening, light lithography, etc., or roughness pattern on a mold surface is transferred to the lens. However, these methods are usable only on low-curvature lenses.

JP 6-167601A discloses a method for producing a porous anti-reflection coating comprising the steps of etching a substrate surface, vapor-depositing a mixed layer of $SiO_2$ and NaF at a volume ratio $NaF/SiO_2$) of 1-3 on the surface, and immersing the mixed layer in water. The immersion of the mixed layer of $SiO_2$ and NaF in water causes NaF to be dissolved in water to form fine pores, resulting in a porous anti-reflection coating Of $SiO_2$. The porous anti-reflection coating obtained by this method has a refractive index of about 1.3. However, this porous anti-reflection coating has large hygroscopicity, resulting in water entering into fine pores during use to change the refractive index, etc. Thus, it suffers from a serious problem of deterioration with time.

JP 2001-272506A discloses a method for producing an anti-reflection coating comprising the steps of forming an alkyl group-containing layer on a substrate at a low temperature using a CVD method, and subjecting the layer to a heat treatment to remove alkyl groups form the layer to form fine pores. Specifically, a silica layer is formed by the reaction of alkyl amines, etc. having large polarity with alkoxysilanes such as tetraisocyanate silane, etc., and the silica layer is heated to 300° C. or higher to remove the alkyl groups. This forms fine pores having diameters of less than 10 nm in the silica layer, thereby providing the silica layer with a refractive index of about 1.25. The heat treatment improves the hydrophobicity of the porous silica layer, making deterioration with time less likely. However, to provide the silica layer with sufficient hydrophobicity, heating should be conducted at higher than 400° C. Some molded glass lenses used as object lenses for light pickup apparatuses have glass transition temperatures lower than 400° C., and the method described in JP 2001-272506A cannot be applied to such lenses.

JP 2005-234447A proposes an optical member having fine roughness on the surface, which comprises an anti-reflection coating formed by treating a zinc-compound-containing gel layer with a water-containing liquid at a temperature of 20° C. or higher. JP 2005-275372A proposes an optical member having fine roughness on the surface, which comprises an anti-reflection coating formed by treating an alumina-containing gel layer with hot water. However, JP 2005-234447A and JP 2005-275372A disclose only optical lenses for spectacles, camera finder lenses, prisms, fly-eye lenses and toric lenses, but fail to describe the formation of anti-reflection coatings containing the above zinc compounds or alumina on high-curvature lenses such as object lenses for light pickup apparatuses, etc.

OBJECT OF THE INVENTION

Accordingly, an object of the present invention is to provide a high-curvature optical element having excellent anti-reflection characteristics in an effective-diameter region to light in a wide wavelength range.

DISCLOSURE OF THE INVENTION

As a result of intense research in view of the above objects, the inventors have found that an optical element having excellent anti-reflection characteristics in an effective-diameter region to light in a wide wavelength range can be obtained by forming an anti-reflection coating having fine roughness with a three-dimensional average surface roughness of 5-100 nm on the surface on a high-curvature lens. The present invention has been completed based on this finding.

Thus, the optical element of the present invention comprises (a) a lens having a portion with a surface inclination angle of 50° or more within an effective-diameter region, a projected area of the portion being 10% or more of that of the effective-diameter region, and (b) an anti-reflection coating formed on the lens, the anti-reflection coating having fine roughness with three-dimensional average surface roughness of 5-100 nm on the surface.

The anti-reflection coating preferably comprises at least one selected from the group consisting of alumina, zinc oxide and zinc hydroxide. The roughness of the anti-reflection coating is preferably constituted by large numbers of fine petal-shaped protrusions irregularly distributed with groove-shaped recesses existing therebetween. The optical element according to a preferred embodiment of the present invention has spectrum reflectance of 18% or less to visible light at an incident angle of 0-70°.

The optical element of the present invention is suitable for a pickup lens for light information recording/regenerating apparatuses.

DESCRIPTION OF THE PREFERRED EMBODIMENTS

[1] Optical Element

Figure 1A:
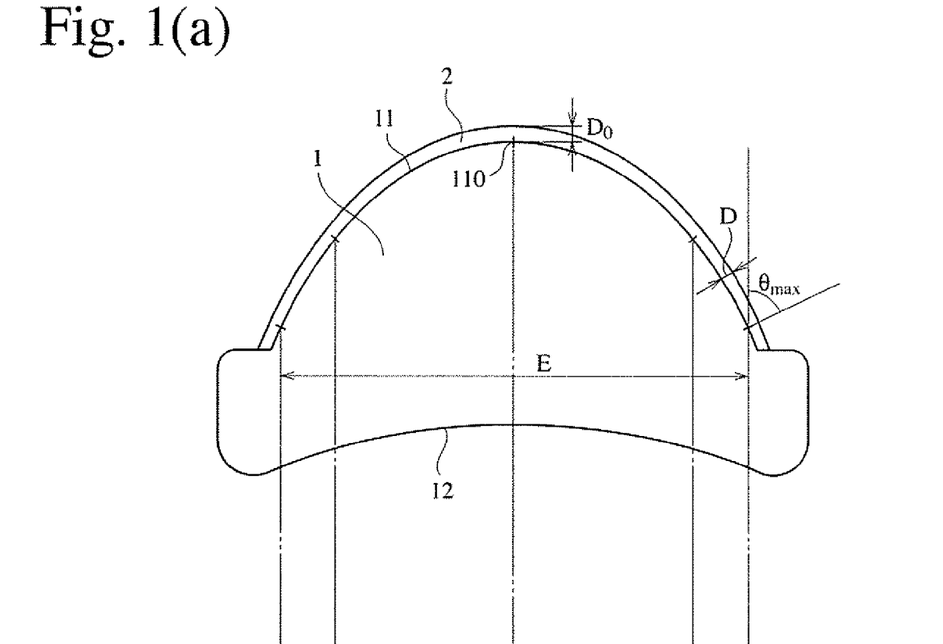
FIG. 1(a) is a vertical cross-sectional view showing one example of the optical elements of the present invention.
Figure 1B:
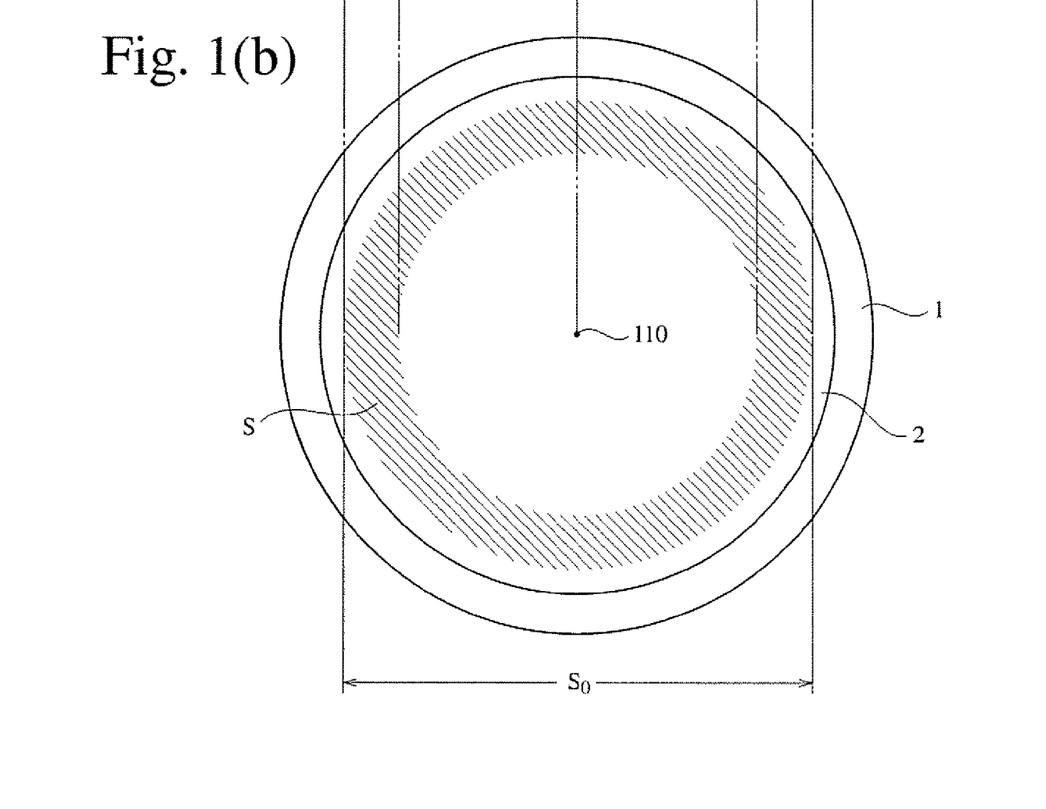
FIG. 1(b) is a plan view showing the optical element of FIG. 1(b).

The optical element of the present invention will be explained in detail referring to the attached drawings, without intention of restricting the present invention thereto. FIG. 1(a) and FIG. 1(b) show one example of the optical elements of the present invention. This optical element comprises a lens 1 having a convex surface 1, and an anti-reflection coating 2 formed on the convex surface 11. A rear surface of the optical element is a concave surface 12. Although the anti-reflection coating 2 is formed only on the convex surface 11 in this example, the anti-reflection coating 2 may be formed on both convex and concave surfaces 11, 12. The formation of ring lattices on the convex surface 11 and/or the concave surface 12 to generate diffraction is also within the scope of the present invention. It should be noted that the thickness of the anti-reflection coating 2 is exaggerated in the figures.

Figure 2:
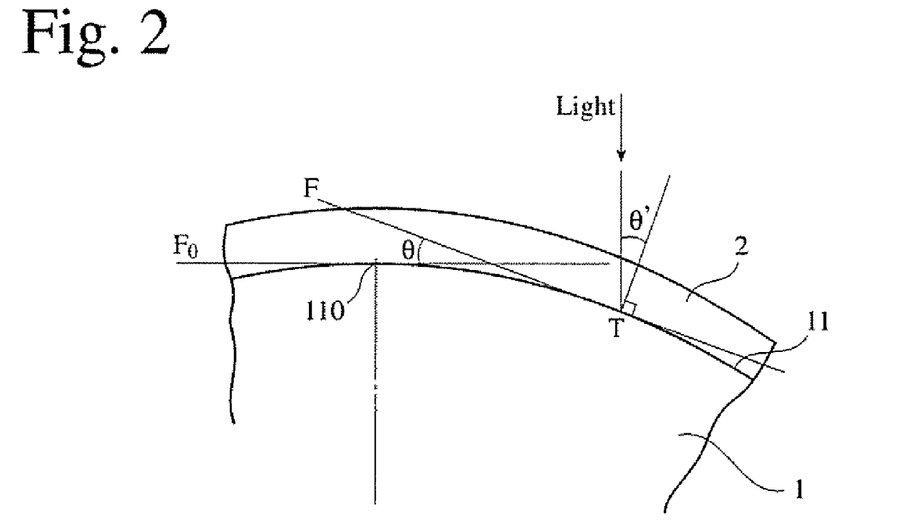
FIG. 2 is a partial, enlarged cross-sectional view showing the optical element of FIG. 1(a).

As shown in FIG. 1(b), a projected area S of a portion having a surface inclination angle $\theta$ of 50° or more in an effective-diameter region E of the lens 1 is 10% or more of an projected area $S_0$ of the effective-diameter region E. In such a lens, the maximum surface inclination angle $\theta_{max}$ is usually 60°-75° in the effective-diameter region E. As shown in FIG. 2, the surface inclination angle $\theta$ at an arbitrary point T on the convex surface 11 of the lens 1 is defined as an angle between a plane Fo tangent to the convex surface 11 at a center point 110 and a plane F tangent to the convex surface 11 at the point T. A lens having the maximum surface inclination angle $\theta_{max}$ of 60-75° is suitable as an object lens for light information recording/regenerating apparatuses, etc. When an incident light is parallel light like laser beams, the incident angle $\theta'$ of the light to the optical element is equal to the surface inclination angle $\theta$.

The lens 1 preferably has a refractive index of 1.45-1.85. When the refractive index is less than 1.45, it is difficult to provide the lens 1 with a high numerical aperture (NA). When the refractive index is more than 1.85, the lens 1 absorbs light having wavelength in a range from ultraviolet to blue, particularly not suitable for laser beams having wavelength of 405 nm. Materials having a refractive index of 1.45-1.85 are optical glass such as BK7 and LASF016, Pyrex® quartz, blue plate glass, white plate glass, PMMA resins, PC resins, polyolefin resins, etc.

The anti-reflection coating 2 has fine roughness having a three-dimensional average surface roughness (SRa) of 5-100 nm on the surface. When the SRa of the anti-reflection coating 2 is less than 5 nm, sufficient anti-reflection characteristics cannot be obtained. However, when the SRa exceeds 100 nm, light scattering occurs, making the anti-reflection coating 2 unsuitable for optical elements. The SRa is preferably 10-80 nm, more preferably 15-50 nm. The SRa is a centerline-average roughness (arithmetic average roughness) Ra measured according to JIS B0601 using an atomic force microscope (AFM), which is three-dimensionally expanded. It is represented by the following formula (1):

$$SRa = \frac{1}{S_0'} \int_{Y_B}^{Y_T} \int_{X_L}^{X_R} |F(X,Y) - Z_0| \, dX \, dY \quad (1)$$

wherein $X_L$-$X_R$ and $Y_B$-$Y_T$ are ranges of X and Y coordinates, respectively, on the measured surface; $S_0$ is an area ($|X_R - X_L| \times |Y_T - Y_B|$) assuming that measured surface is flat; F(X,Y) is height at the measured point (X,Y); and $Z_0$ is average height in the measured surface.

Though not particularly restricted, the maximum height difference (P–V) of fine roughness in the anti-reflection coating 2 is preferably 20-1000 nm, more preferably 50-500 nm, particularly 100-300 nm. The P–V value is measured by AFM.

Though not particularly restricted, the specific surface area ($S_R$) of the anti-reflection coating 2 is preferably 1.10 or more, more preferably 1.15 or more. $S_R$ is determined by the following formula (2):

$$S_R = S'/S_0 \quad (2),$$

wherein $S_0$ is an area assuming that the measured surface is flat, and S' is a measured surface area. S' is determined as follows. A region to be measured is divided to micro-triangles of three closest data points (A, B, C), and the area $\Delta S'$ of each micro-triangle is determined by a vector product, $\Delta S(\Delta ABC) = |AB \times AC|/2$, wherein AB and AC respectively represent the length of sides. $\Delta S'$ is summed to obtain S'. $S_R$ is preferably as large as not causing light scattering.

Figure 5:
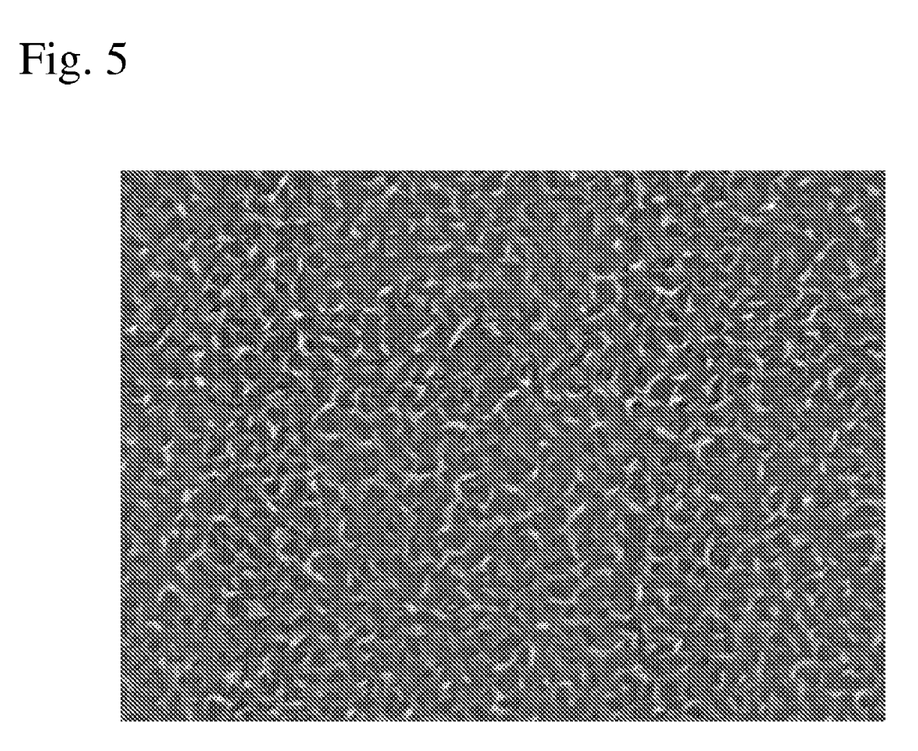
FIG. 5 is an SEM photograph of a petal-shaped alumina layer of the anti-reflection coating.

The anti-reflection coating 2 is preferably a layer obtained by treating an alumina-containing gel layer with hot water, or a layer obtained by treating a zinc-compound-containing gel layer with a water-containing liquid at a temperature of 20° C. or higher. The former layer has surface roughness constituted by an irregular arrangement of large numbers of fine, irregularly shaped protrusions formed when a surface portion of the alumina-containing gel layer is subjected to the function of hot water, and groove-shaped recesses existing therebetween. FIG. 5 is an SEM photograph showing that such protrusions are extremely fine with petal-like shapes. Unless otherwise mentioned, this layer is called "petal-shaped alumina layer" below. The latter layer has surface roughness constituted by an irregular arrangement of protrusions, which are precipitates formed when a surface portion of the zinc-compound-containing gel layer is subjected to the function of the water-containing liquid at a temperature of 20° C. or higher, and recesses existing therebetween. Such protrusions are extremely fine, though their shapes differ depending on the type of a zinc compound. Unless otherwise mentioned, this layer is called "zinc compound layer" below.

The petal-shaped alumina layer preferably comprises alumina as a main component, more preferably is composed of alumina only, and it may contain at least one optional component selected from the group consisting of zirconia, silica, titania, zinc oxide and zinc hydroxide, if necessary. The amount of the optional component added is preferably 0.01-50% by mass, more preferably 0.05-30% by mass, based on 100% by mass of the overall dust-proof coating, though not particularly restricted as long as it is within a range of forming fine roughness without deteriorated transparency when the alumina-containing gel layer is treated with hot water.

The zinc compound layer is preferably composed of zinc oxide and/or zinc hydroxide as main components, more preferably composed of any one of them. The zinc compound layer may contain at least one optional component selected from the group consisting of alumina, zirconia, silica and titania, if necessary. The amount of the optional component added is preferably 0.01-50% by mass, more preferably 0.05-30% by mass, based on 100% by mass of the entire dust-proof coating, though not particularly restricted as long as it is within a range of forming fine roughness without deteriorated transparency when the zinc-compound-containing gel layer is treated with a water-containing liquid at 20° C. or higher.

The roughness of the anti-reflection coating 2 can be examined, for instance, by the observation of a surface layer and/or a cross section with a scanning electron microscope (SEM) or AFM particularly in a slanting direction.

Although the anti-reflection coating 2 is single layer in the example shown in FIG. 1(a) and FIG. 1(b), the present invention is not restricted thereto but may include other layers than the petal-shaped alumina or zinc compound layer. In the case of a multi-layer anti-reflection coating 2, the petal-shaped alumina or zinc compound layer is preferably formed on the outermost surface. With the petal-shaped alumina or zinc compound layer formed on the outermost surface, good anti-reflection can be obtained by its fine roughness, but as long as fine roughness is secured, other layers may be formed on the petal-shaped alumina or zinc compound layer.

The refractive index of the anti-reflection coating 2 depends on an area ratio of pore regions (recesses) provided by fine roughness. Because the anti-reflection coating 2 has mountain-shaped, fine protrusions, the area ratio of pore regions (recesses) decreases as becoming deep from the surface. Accordingly, the anti-reflection coating 2 is a gradient layer having an increasing refractive index as becoming lower from the surface. The preferred thickness of the anti-reflection coating 2 may vary depending on the refractive index and wavelength used. In the case of an object lens (pickup lens) for light information recording/regenerating apparatuses, the physical thickness of the anti-reflection coating 2 is preferably 50-3000 nm, more preferably 100-300 nm. It should be noted that this thickness includes the thickness of fine surface roughness.

The ratio ($D/D_0$) of the physical thickness D of the anti-reflection coating 2 on a peripheral portion of the lens 1 to the physical thickness Do of the anti-reflection coating 2 at a center of the lens 1 is preferably in a range from $\cos \theta^{0.7}$ to $\cos(\sin^{-1}(\sin \theta/n))^{-1}$, wherein $\theta$ is a surface inclination angle of the anti-reflection coating 2, and n is a refractive index of the anti-reflection coating 2. The peripheral portion of the lens 1 is a portion having a surface inclination angle $\theta$ of 50° or more. Although the physical thickness of the anti-reflection coating 2 gradually decreases as going from the lens center to the peripheral portion, the rate of decrease is relatively small. Accordingly, even a lens design having the anti-reflection coating 2 with optimum thickness at a center provides the anti-reflection coating 2 with enough thickness in the peripheral portion, thereby exhibiting good anti-reflection characteristics. When the physical thickness of the anti-reflection coating 2 is not uniform on the peripheral portion of the lens 1, its maximum, minimum or average may be used as the physical thickness D.

[2] Production of Optical Element

Taking for example the production of the anti-reflection coating 2 constituted by only a petal-shaped alumina or zinc compound layer on a surface of the lens 1, the production method of the optical element will be explained without intention of restriction.

(a) Formation of Petal-Shaped Alumina Layer

The petal-shaped alumina layer is obtained by coating the lens 1 with a coating liquid comprising an aluminum compound to form an alumina-containing gel layer, and treating the gel layer with hot water. This method is usable on a lens 1 having no sufficient heat resistance, because it can form the petal-shaped alumina layer without a baking step at a high temperature.

The aluminum compounds may be aluminum alkoxides, aluminum nitrate, aluminum sulfate, etc., preferably aluminum alkoxides. The formation of the petal-shaped alumina layer using aluminum alkoxides is described in, for instance, JP 9-202649A, JP 3688042B and JP 9-202651A. According to these methods, a coating liquid comprising aluminum alkoxide, a stabilizing agent and water is applied to a lens to form an alumina gel layer by a sol-gel method, and the alumina gel layer is treated with hot water to obtain the petal-shaped alumina layer. The formation of the petal-shaped alumina layer by using aluminum alkoxide will be explained in detail below.

The aluminum alkoxides may be, for instance, aluminum trimethoxide, aluminum triethoxide, aluminum triisopropoxide, aluminum tri-n-butoxide, aluminum tri-sec-butoxide, aluminum tri-tert-butoxide, aluminum acetylacetate, oligomers obtained by their partial hydrolysis, etc.

When the petal-shaped alumina layer comprises the above optional component, at least one optional-component-forming material selected from the group consisting of zirconium alkoxides, alkoxysilanes, titanium alkoxides and zinc compounds is added to the coating liquid.

The zirconium alkoxides may be, for instance, zirconium tetramethoxide, zirconium tetraethoxide, zirconium tetra-n-propoxide, zirconium tetraisopropoxide, zirconium tetra-n-butoxide, zirconium tetra-t-butoxide, etc.

The alkoxysilanes are represented by the general formula (3) of $Si(OR_1)_x(R_2)_{4-x}$. In the general formula (3), $R_1$ is preferably an alkyl group having 1-5 carbon atoms or an acyl group having 1-4 carbon atoms, for instance, a methyl group, an ethyl group, an n-propyl group, an i-propyl group, an n-butyl group, a sec-butyl group, a tert-butyl group, an acetyl group, etc. $R_2$ is preferably an organic group having 1-10 carbon atoms, for instance, unsubstituted hydrocarbon groups such as a methyl group, an ethyl group, an n-propyl group, an i-propyl group, an n-butyl group, a tert-butyl group, an n-hexyl group, a cyclohexyl group, an n-octyl group, a tert-octyl group, an n-decyl group, a phenyl group, a vinyl group, an allyl group, etc., or substituted hydrocarbon groups such as a γ-chloropropyl group, a $CF_3CH_2-$ group, a $CF_3CH_2CH_2-$ group, a $C_2F_5CH_2CH_2-$ group, a $C_3F_7CH_2CH_2CH_2-$ group, a $CF_3OCH_2CH_2CH_2-$ group, a $C_2F_5OCH_2CH_2CH_2-$ group, a $C_3F_7OCH_2CH_2CH_2-$ group, a $(CF_3)_2CHOCH_2CH_2CH_2-$ group, a $C_4F_9CH_2OCH_2CH_2CH_2-$ group, a 3-(perfluorocyclohexyloxy)propyl group, a $H(CF_2)_4CH_2OCH_2CH_2CH_2-$ group, a $H(CF_2)_4CH_2CH_2CH_2-$ group, a γ-glycidoxypropyl group, a γ-mercaptopropyl group, a 3,4-epoxy cyclohexyl ethyl group, a γ-methacroyloxypropyl group, etc. x is preferably an integer of 2-4.

The titanium alkoxides may be, for instance, tetramethoxy titanium, tetraethoxy titanium, tetra-n-propoxy titanium, tetraisopropoxy titanium, tetra-n-butoxy titanium, tetraisobutoxy titanium, etc.

The zinc compounds may be, for instance, zinc acetate, zinc chloride, zinc nitrate, zinc stearate, zinc oleate, zinc salicylate, etc. Among them, zinc acetate and zinc chloride are preferable.

The ratio of the optional-component-forming material to the total amount (100% by mass) of the aluminum alkoxide and the optional-component-forming material is preferably 0.01-50% by mass, more preferably 0.05-30% by mass.

The stabilizing agents preferably added to the coating liquid are, for instance, β-diketones such as acetylacetone, ethyl acetoacetate, etc.; alkanolamines such as monoethanolamine, diethanolamine, triethanolamine, etc.; metal alkoxides, etc.

The coating liquid may contain a solvent. The usable solvents may be, for instance, methyl alcohol, ethyl alcohol, propyl alcohol, butyl alcohol, methyl Cellosolve, ethyl Cellosolve, etc.

The preferred formulation by mol of the metal alkoxide, the solvent, the stabilizing agent and water is (aluminum alkoxide+optional-component-forming material)/solvent/stabilizing agent/water of 1/(10–100)/(0.5–2)/(0.1–5).

The coating liquid may contain a catalyst for accelerating the hydrolysis of an alkoxyl group and dehydration condensation. The catalysts added may be, for instance, nitric acid, hydrochloric acid, sulfuric acid, phosphoric acid, acetic acid, ammonia, etc. The amount of the catalyst added is preferably 0.01-100% by mol of the metal alkoxide.

The coating liquid may contain a water-soluble, organic, high-molecular compound, if necessary. When the alumina gel layer obtained from the coating liquid containing the water-soluble, organic, high-molecular compound is treated with hot water, the water-soluble, organic, high-molecular compound is easily eluted from the alumina gel layer, resulting in an increased surface area of the alumina gel layer reactable with hot water. This makes it possible to form the petal-shaped alumina layer at a relatively low temperature for a short period of time. The shape of roughness of the petal-shaped alumina layer formed can be controlled by selecting the type and molecular weight of the water-soluble, organic, high-molecular compound. The water-soluble, high-molecular compounds used may be, for instance, polyvinyl pyrrolidone, polyvinyl alcohol, polymethyl vinyl ether, polyethylene glycol, polypropylene glycol, etc. The amount of the water-soluble, high-molecular compound added may be 0.1-10% by mass of alumina, when it is assumed that all the aluminum alkoxide is converted to alumina.

The coating method may be, for instance, a dipping method, a spin-coating method, a nozzle-flow-coating method, a spraying method, a reverse-coating method, a flexography method, a printing method, a flow-coating method, and their combinations. Among them, the dipping method is preferable, because it can easily control the uniformity, thickness, etc. of the resultant thin layer. The thickness of the resultant gel layer can be controlled by adjusting a withdrawing speed in the dipping method, a substrate-rotating speed in the spin-coating method, the concentration of the coating liquid, etc. The withdrawing speed in the dipping method is preferably about 0.1-4.0 mm/second.

The drying conditions of the coated layer are not particularly restrictive, but may be properly selected depending on the heat resistance of the substrate, etc. In general, the coated lens 1 is treated at a temperature from room temperature to 400° C. for 5 minutes to 24 hours.

The lens 1 provided with the alumina gel layer is treated with hot water. The temperature of the hot water is properly selected depending on the heat resistance of the lens 1. When immersed in hot water, the treatment is preferably conducted at a temperature of about 50° C. to about 100° C. for about 1-240 minutes. After treated with hot water, it is preferably dried at a temperature from room temperature to 400° C., more preferably baked at a temperature of 100-400° C. The drying (baking) time is preferably 10 minutes to 24 hours. The petal-shaped alumina layer thus formed is usually colorless and highly transparent.

(b) Formation of Zinc Compound Layer

A zinc compound-containing solution or dispersion is applied to a lens 1 and dried to form a gel layer, which is treated with a water-containing liquid at a temperature of 20° C. or higher to obtain a zinc compound layer. Because this method forms the zinc compound layer at a relatively low temperature, it is usable on a lens 1 with insufficient heat resistance.

The zinc compounds used may be, for instance, zinc acetate, zinc chloride, zinc nitrate, zinc stearate, zinc oleate, zinc salicylate, etc. Among them, zinc acetate and zinc chloride are preferable. When the zinc compound layer contains the above optional component, at least one optional-component-forming material selected from the group consisting of aluminum alkoxides, zirconium alkoxides, alkoxysilanes and titanium alkoxides is added to the coating liquid.

The aluminum alkoxides, the zirconium alkoxides, the alkoxysilanes and the titanium alkoxides used may be the same as described above. The optional-component-forming material is preferably 0.01-50% by mass, more preferably 0.05-30% by mass, per the total amount (100% by mass) of the zinc compound and the optional-component-forming material.

Solvents in the coating liquid and coating methods may be the same as for forming the petal-shaped alumina layer. The formulation of the coating liquid is preferably (zinc compound+optional-component-forming material)/solvent=1/(10–20) by mol. The coating liquid may contain the above stabilizing agents, catalysts and water, if necessary. After coating, the zinc compound layer may be dried at room temperature for about 30 minutes, and if necessary, it may be heat-dried.

The dried gel layer is treated with the water-containing liquid at a temperature of 20° C. or higher. This treatment deflocculates a surface of the gel layer, causing the rearrangement of its structure. As a result, zinc oxide, zinc hydroxide or their hydrates are precipitated and grow on a surface layer of the gel layer. The term "water-containing liquid" used herein means water or a mixture of water with another solvent. Another solvent may be, for instance, alcohol. The temperature of the water-containing liquid is preferably 20-100° C. The time period of treatment with the water-containing liquid is preferably about 5 minutes to about 24 hours. The zinc compound layer thus formed is usually colorless and highly transparent.

[3] Use of Optical Element

The optical element of the present invention has high anti-reflection characteristics in an effective-diameter region to light in a wide wavelength range from a visible range to an infrared range. Specifically, it usually has spectrum reflectance of 18% or less, preferably 12.0% or less, to visible light (wavelength: 380-780 nm) at an incident angle of 0-70°. The optical elements having such characteristics are suitable as lenses for, for instance, light information recording/regenerating apparatuses, semiconductor-developing apparatuses, cameras, endoscopes, light communications parts such as laser diode (LD) modules, optical multiplexers, optical demultiplexers, etc. Light sources with various wavelengths are used for light information recording/regenerating media such as CDs, DVDs, blu-ray disks, HD-DVDs, etc., and the optical element of the present invention can be used as a pickup lens for any of them. The shape of the optical element of the present invention may be properly selected depending on its use. For instance, when it is used as a pickup lens for a light information recording/regenerating apparatus, it usually has such a shape as shown in FIG. 1. When it is used for endoscopes and light communications parts, it usually has a ball shape.

The present invention will be explained in more detail referring to Examples below without intention of restricting the present invention thereto.

EXAMPLE 1

200 g of aluminum sec-butoxide was mixed with 700 g of sufficiently dehydrated isopropyl alcohol in a low-humidity atmosphere, sufficiently stirred at room temperature, mixed with 105 g of ethyl acetoacetate, and then stirred for 3 hours. At the same time, 300 g of isopropyl alcohol was mixed with 45 g of water in the same atmosphere, and stirred. The resultant aluminum sec-butoxide solution was mixed with an aqueous isopropyl alcohol solution, and stirred at room temperature for 24 hours to prepare a coating liquid. The resultant coating liquid was applied to a convex surface 11 of a lens 1 made of borosilicate crown glass (BK7) having an effective diameter of 3 mm, $S/S_0 (\times 100)$ of 62%, and a refractive index of 1.518 (see FIG. 1) by a spin-coating method, cured by heating at a temperature of 150° C. for 2 hours, to obtain a lens coated with a transparent alumina gel layer having a refractive index of 1.38 and a physical thickness of 272 nm. The resultant alumina-gel-coated lens was immersed in boiled distilled water for 10 minutes, and dried by heating at a temperature of 150° C. for 30 minutes to obtain an anti-reflection lens having a petal-shaped alumina layer having three-dimensional average surface roughness (SRa) of 20.6 nm, the maximum roughness height difference (P–V) of 191.5 nm, and a specific surface area ($S_R$) of 1.25. Laser beams having wavelength of 405 nm, 650 nm and 780 nm, respectively, were caused to enter into this anti-reflection lens through the convex surface 11 to examine transmittance. The results are shown in Table 1.

EXAMPLE 2

An anti-reflection lens having a petal-shaped alumina layer having three-dimensional average surface roughness (SRa) of 22.3 nm, the maximum roughness height difference (P–V) of 206.0 nm, and a specific surface area ($S_R$) Of 1.26 was produced in the same manner as in Example 1 except for using a lens 1 made of LAK14 glass [effective diameter: 3 mm, $S/S_0 (\times 100)$: 62%, refractive index: 1.72]. This anti-reflection lens was examined with respect to transmittance in the same manner as in Example 1. The results are shown in Table 1.

COMPARATIVE EXAMPLE 1

A lens 1 made of the same BK7 glass as in Example 1, which was not provided with an anti-reflection coating, was examined with respect to transmittance in the same manner as in Example 1. The results are shown in Table 1.

COMPARATIVE EXAMPLE 2

Using an apparatus having an electron-beam evaporation source, an $MgF_2$ layer (refractive index: 1.38) having a physical thickness of 127 nm was formed on a convex surface 11 of a lens 1 made of the same BK7 glass as in Example 1 by a vapor deposition method. The resultant anti-reflection lens was examined with respect to transmittance in the same manner as in Example 1. The results are shown in Table 1.

COMPARATIVE EXAMPLE 3

A lens 1 made of the same LAK14 glass as in Example 2, which was not provided with an anti-reflection coating, was examined with respect to transmittance in the same manner as in Example 1. The results are shown in Table 1.

COMPARATIVE EXAMPLE 4

Using an apparatus having an electron-beam evaporation source, an $MgF_2$ layer having a physical thickness of 127 nm was formed on a convex surface 11 of a lens 1 made of the same LAK14 glass as in Example 2 by a vapor deposition method. The resultant anti-reflection lens was examined with respect to transmittance in the same manner as in Example 1. The results are shown in Table 1.

COMPARATIVE EXAMPLE 5

Using an apparatus having an electron-beam evaporation source, an anti-reflection coating (total thickness: 391 nm)

was formed on a convex surface 11 of a lens 1 made of the same LAK14 glass as in Example 2 by a vapor deposition method, such that it had the structure as shown in Table 2. The resultant anti-reflection lens was examined with respect to transmittance in the same manner as in Example 1. The results are shown in Table 1.

TABLE 1

| No. | Material of Lens | Anti-Reflection Coating Material | SRa[1] (nm) |
|---|---|---|---|
| Example 1 | BK7[2] | Alumina | 20.6 |
| Example 2 | LAK14[3] | Alumina | 22.3 |
| Comparative Example 1 | BK7 | — | 0.3 |
| Comparative Example 2 | BK7 | MgF$_2$[4] | 0.9 |
| Comparative Example 3 | LAK14 | — | 0.7 |
| Comparative Example 4 | LAK14 | MgF$_2$ | 0.8 |
| Comparative Example 5 | LAK14 | 8 Layers Having ZrO$_2$[5] Layers and MgF$_2$ Layers Alternately | 1.2 |

| No. | Transmittance (%) 405 nm[6] | 650 nm[6] | 780 nm[6] |
|---|---|---|---|
| Example 1 | 92.6 | 89.9 | 88.0 |
| Example 2 | 89.8 | 89.7 | 89.4 |
| Comparative Example 1 | 85.7 | 86.1 | 86.2 |
| Comparative Example 2 | 88.4 | 87.9 | 87.6 |
| Comparative Example 3 | 81.1 | 81.7 | 81.8 |
| Comparative Example 4 | 86.1 | 85.6 | 84.8 |
| Comparative Example 5 | 87.5 | 83.9 | 82.2 |

Note:
[1]Three-dimensional average surface roughness.
[2]Refractive Index: 1.518.
[3]Refractive Index: 1.72.
[4]Refractive Index: 1.38.
[5]Refractive Index: 2.0.
[6]Wavelength of laser beams.

TABLE 2

| Layer Structure | Composition | Refractive Index | Physical Thickness (nm) |
|---|---|---|---|
| First Layer | ZrO$_2$ | 2.0 | 14 |
| Second Layer | MgF$_2$ | 1.38 | 27 |
| Third Layer | ZrO$_2$ | 2.0 | 37 |
| Fourth Layer | MgF$_2$ | 1.38 | 16 |
| Fifth Layer | ZrO$_2$ | 2.0 | 136 |
| Sixth Layer | MgF$_2$ | 1.38 | 19 |
| Seventh Layer | ZrO$_2$ | 2.0 | 25 |
| Eighth Layer | MgF$_2$ | 1.38 | 117 |

Because each sample of Examples 1 and 2 had the petal-shaped alumina layer, its surface had fine roughness with SRa of 5-100 nm, resulting in high transmittance to laser beams of each wavelength, and thus excellent anti-reflection characteristics. On the other hand, the samples of Comparative Examples 1 and 3 without an anti-reflection coating had much poorer anti-reflection characteristics than those of the samples of Examples 1 and 2. The samples of Comparative Examples 2 and 4 having anti-reflection MgF$_2$ coatings, and the sample of Comparative Example 5 having a multi-layer ZrO$_2$/MgF$_2$ coating were also poorer in anti-reflection performance than the samples of Examples 1 and 2 as a whole.

EFFECT OF THE INVENTION

The optical element of the present invention having an anti-reflection coating having fine roughness with a three-dimensional average surface roughness of 5-100 nm on the surface has excellent anti-reflection characteristics in an effective-diameter region to light in a wide wavelength range from a visible range to an infrared range, despite the fact that it has a high curvature. The optical elements having such characteristics are suitable as lenses for light information recording/regenerating apparatuses, semiconductor-developing apparatuses, cameras, endoscopes, light communications parts, etc. Because the anti-reflection coating is formed by treating the gel layer formed by a sol-gel method with warm water such as hot water at about 50-100° C. or a water-containing liquid at 20° C. or higher, no expensive treatment apparatus is needed, enabling the low-cost production of the optical element of the present invention.

The present disclosure relates to subject matter contained in Japanese Patent Application No. 2006-4125 filed on Jan. 12, 2006, which is expressly incorporated herein by reference in its entirety.

What is claimed is:

1. An optical element comprising (a) a lens having a portion with a surface inclination angle of 50° or more within an effective-diameter region, a projected area of said portion being 10% or more of that of said effective-diameter region, and (b) an anti-reflection coating formed on said lens, said anti-reflection coating having fine roughness with three-dimensional average surface roughness of 5-100 nm on the surface, wherein said anti-reflection coating comprises at least one of alumina, zinc oxide and zinc hydroxide, and wherein the roughness of said anti-reflection coating is constituted by large numbers of fine petal-shaped protrusions irregularly distributed with groove-shaped recesses existing therebetween.

2. The optical element according to claim 1, wherein it has spectrum reflectance of 18% or less to visible light at an incident angle of 0-70.

3. A pickup lens for light information recording/regenerating apparatuses, which is constituted by the optical element recited in claim 1.

4. A light information recording/regenerating apparatus comprising the pickup lens recited in claim 3.

* * * * *